(12) United States Patent
Böhm

(10) Patent No.: US 11,127,970 B2
(45) Date of Patent: Sep. 21, 2021

(54) METHOD FOR PRODUCING AN ELECTRODE STACK FOR ENERGY STORES, AND STACKING SYSTEM

(71) Applicant: Volkswagen Aktiengesellschaft, Wolfsburg (DE)

(72) Inventor: Dennis Böhm, Wolfenbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 196 days.

(21) Appl. No.: 16/250,235

(22) Filed: Jan. 17, 2019

(65) Prior Publication Data
US 2019/0229360 A1    Jul. 25, 2019

(30) Foreign Application Priority Data
Jan. 22, 2018    (DE) .................... 10 2018 200 958.9

(51) Int. Cl.
*H01M 10/04*      (2006.01)
*H01M 4/139*      (2010.01)
(Continued)

(52) U.S. Cl.
CPC ....... *H01M 10/0404* (2013.01); *H01M 4/139* (2013.01); *H01M 10/045* (2013.01);
(Continued)

(58) Field of Classification Search
CPC ......... H01M 10/0404; H01M 10/0583; H01M 10/0459; H01M 10/045; H01M 2220/20; H01M 10/0431
See application file for complete search history.

(56) References Cited

U.S. PATENT DOCUMENTS

2004/0154160 A1    8/2004  Hong
2013/0133184 A1    5/2013  Bacci et al.
(Continued)

FOREIGN PATENT DOCUMENTS

DE    10 2010 055 617 A1    6/2012
DE    10 2010 055617 A1     6/2012
(Continued)

OTHER PUBLICATIONS

Search report for European Patent Application No. EP 19 15 2915, dated Jun. 19, 2019.
(Continued)

*Primary Examiner* — Stewart A Fraser
(74) *Attorney, Agent, or Firm* — Pearl Cohen Zedek Latzer Baratz LLP

(57) ABSTRACT

A method for producing an electrode stack for an energy store of a motor vehicle; as electrodes, cathodes and anodes being alternately stacked on top of one another with the interposition of a separator strip, the separator strip first having the cathodes and anodes laid thereon, thereby forming an electrode strip, and, subsequently thereto, the electrode strip being folded numerous times to stack the cathodes and the anodes on top of one another. It is provided that the electrode strip be oriented in a horizontal plane for the folding process, and, on that basis, be folded in sections or, as a whole, between the electrodes.

13 Claims, 3 Drawing Sheets

(51) Int. Cl.
    *H01M 10/0583*    (2010.01)
    *H01M 4/04*    (2006.01)

(52) U.S. Cl.
    CPC ... *H01M 10/0459* (2013.01); *H01M 10/0583* (2013.01); *H01M 4/04* (2013.01); *H01M 10/0431* (2013.01); *H01M 2220/20* (2013.01)

(56) References Cited

U.S. PATENT DOCUMENTS

| | | | | |
|---|---|---|---|---|
| 2015/0129107 | A1* | 5/2015 | Miyazaki | B32B 38/1841 156/64 |
| 2015/0162638 | A1 | 6/2015 | Bernini et al. | |
| 2015/0263375 | A1* | 9/2015 | Redmann | H01M 10/0583 29/623.1 |
| 2018/0170705 | A1 | 6/2018 | Glodde et al. | |
| 2019/0131659 | A1* | 5/2019 | Nam | H01M 10/0472 |
| 2019/0237797 | A1* | 8/2019 | Cho | H01M 10/0404 |

FOREIGN PATENT DOCUMENTS

| | | |
|---|---|---|
| DE | 10 2012 019 975 B3 | 11/2013 |
| DE | 10 2015 108 651 A1 | 12/2016 |
| EP | 1 261 063 A2 | 11/2002 |
| JP | 2013-222601 A | 10/2013 |
| KR | 10-2012-0118882 | 10/2012 |
| KR | 10 2013 0 094 574 A | 8/2013 |
| KR | 10-2017-0032042 | 3/2017 |
| KR | 10-2017-0044971 | 4/2017 |
| KR | 10-2017-0044972 | 4/2017 |
| KR | 10-2017-0059739 | 5/2017 |
| KR | 10 2018 0 001 458 A | 1/2018 |
| WO | WO 2012/099205 A1 | 7/2012 |

OTHER PUBLICATIONS

Office Action for Korean Patent Application No. 10-2019-0007326, dated Jun. 29, 2020.
Search report for German Patent Application No. 10 2018 200 958.9, dated Nov. 21, 2018.

* cited by examiner

METHOD FOR PRODUCING AN ELECTRODE STACK FOR ENERGY STORES, AND STACKING SYSTEM

CROSS-REFERENCE TO RELATED APPLICATIONS

This application claims priority from German Patent Application No. 10 2018 200 958.9, filed Jan. 22, 2018, which is hereby incorporated by reference.

FIELD OF THE INVENTION

The present invention relates to a method for producing an electrode stack for an energy store of a motor vehicle, cathodes and anodes being alternately stacked on top of one another with the interposition of a separator, the separator first having the cathodes and anodes laid thereon, thereby forming an electrode strip, and the electrode strip being subsequently folded numerous times to stack the cathodes and anodes on top of one another.

SUMMARY OF THE INVENTION

The present invention also relates to a stacking system for producing an electrode stack, in particular for implementing the method mentioned above, including a folding device for folding an electrode strip into an electrode stack, the electrode strip having a separator strip that, as electrodes, includes anodes and cathodes laid thereon, where anodes and cathodes are alternately stacked on top of one another with the interposition of a separator.

Energy stores for motor vehicles typically have anodes and cathodes which are stacked on top of one another and are separated from one another in each case by a separator. This forms battery cells which are electrically interconnected in order to form an energy store. It is known to produce an electrode stack of this kind by stacking the individual elements on top of one another. The cathodes, anodes and separators are thereby produced independently of one another and successively stacked one on top of one another. The stacking process is often performed by robots that grip the individual elements and stack them one on top of the other with positional accuracy. Due to the complex grip movements this requires, only a limited assembly speed is attainable, and substantial design outlay is required.

To facilitate the stacking of the individual components, the German Published Unexamined Application 10 2010 055 617 A1 provides for laying the electrodes on a separator strip and for folding the separator strip provided with the electrodes in a Z shape, in order to form the electrode stack from the separator strip. However, it does not describe how exactly the folding is to take place. It can merely be inferred from the figures that the electrode strip is folded downwards by a vertical movement. The laid-open application WO 2016/192717 A1 also provides this as a method for folding a sheet material. An electrode stack is also to be thereby produced. The folding system thereby folds up a fed electrode strip incrementally, the electrode strip being fed from above to the folding system.

SUMMARY OF THE INVENTION

It is an object of the present invention to provide an improved method, as well as an improved folding system, respectively stacking system, that readily permit an advantageous folding of the electrode strip into the electrode stack; the stacking system, respectively the folding process being, in particular integrable into a process for producing the electrode strip.

The objective underlying the present invention is achieved by a method having the features set forth in the claims. Here, the advantage is derived that, following its manufacture, the electrode strip is fed directly to the stacking system, respectively to the folding. The folding process and the manufacturing of the electrode strip are thus advantageously combined. The present invention achieves this by orienting the electrode strip in a horizontal plane for the folding process, and, on that basis, by carrying out the folding in sections or as a whole between the electrodes. As in the related art, the folding is carried out between the electrodes in an electrode-free area of the separator strip which, in comparison to the area provided with electrodes, is more flexible and is thus more readily shaped, respectively folded, in particular without the electrodes being thereby damaged. In contrast to the known approaches, however, the electrode strip is disposed in a horizontal plane upon folding, whereby it is achieved, for example, that the electrode strip, upon which the electrodes are laid in a preceding operation, may be horizontally fed further, directly to the folding process.

In accordance with a preferred embodiment of the present invention, the electrode strip is laminated prior to the folding. The lamination advantageously secures the electrodes to the separator strip and holds them permanently thereon. In particular, after the cathodes are laid thereon, in particular on a first side of the separator strip, the electrode strip is laminated once, and, after the anodes are laid thereon, in particular on the other or rear side of the separator strip, laminated once again. If the cathodes are first laid on the separator strip, then lamination including the cathodes is first performed; if anodes are first laid on the separator strip, then lamination including the anodes is first performed. The two-times lamination ensures that the electrodes, respectively anodes or cathodes, which are applied once, are securely fastened to the electrode strip before the other electrodes, in particular cathodes or anodes, are placed on the separator strip, in particular on the rear side thereof. The result hereby is that a laminated electrode strip, respectively a laminated composite of anodes, cathodes, and separator strips, is folded in the folding process.

For the purpose of folding at the longitudinal sides thereof, it is also preferably provided that the electrode strip be gripped at opposite points between each second electrode, tensioned transversely, and lifted. Tensioning the electrode strip at the longitudinal sides thereof between each second electrode, pretensions the separator strip between adjacent electrodes, thereby forming a fold line that induces the electrode strip to fold on its own along the same in response to a simple lifting of the grippers mutually in parallel—in particular due to the weight force of the electrodes disposed on both sides of the fold line. This ensures a simple and energy-efficient folding of the separator strip, respectively of the electrode strip including the electrodes.

It is also preferably provided that the electrode strip be held down between every second other electrode upon raising of the grippers. This ensures that the folding process is even practicable when the separator strip is so stiff that the electrodes' own weight does not suffice for bending or folding the separator strip upon raising of the grippers. It is especially preferred that compressed air hold down the electrode strip between every other second electrode, thus between the electrodes between which the grippers do not grip. The holding down process is thus carried out without any contact and in a manner that is very gentle to the electrode strip.

A preferred embodiment of the present invention provides that the grippers be simultaneously raised and moved toward each other for the folding process, so that the electrode strip is folded in a Z shape. The simultaneous lifting and converging movement forms a plurality of fold lines at the same time, and the electrode strip, in particular the separator strip, is folded simultaneously at a plurality of points along the longitudinal extent thereof. As a result, the folding process takes place in an especially short period of time. It is alternatively conceivable that the grippers be raised in succession, two opposite grippers always being raised or moved simultaneously in order to incrementally fold the electrode strip in a Z shape.

The electrode strip is also preferably fed toward a holder and incrementally folded into the same. The feeding toward the holder exerts a compressive force on the electrode strip that is relieved upon folding of the electrode strip into the holder, in particular by the previously mentioned grippers. Moreover, feeding the electrode strip toward the holder places the electrode strip in the holder already upon folding, allowing it to be simply handled subsequently to the folding process, for example, by moving the holder, together with the electrode strip, further, or by removing the electrode strip as a stack from the holder.

It is also preferably provided that at least two opposing grippers be guided along a curved track, which is oriented at least essentially orthogonally to the extent of the electrode strip, in order to grip the electrode strip incrementally between each second electrode and fold it into the holder in response to the movement on a curve. In response to the movement along the curved track, which, in particular is a circular track, the electrode strip is simultaneously raised by the gripper and fed toward the holder. In this manner, the electrode strip is automatically folded into the holder. The portion of the electrode strip already folded into the holder is preferably held, respectively retained in the holder, so that it does not fall out of the holder. This could otherwise occur due to the electrodes' own weight because the electrode strip extends along the horizontal track. In this approach, the electrode strip, in particular, is retained in the holder only by the upper end thereof, thereby ensuring an especially simple and secure arresting of the portion of the electrode strip that is already folded into the holder.

It is also preferably provided that, additionally or alternatively to the grippers guided along a curved track, the holder be moved vertically up and down to fold the electrode strip. If the electrode strip is fed toward the holder, and the holder is moved up and down, the electrode strip is folded by the up and down movement of the holder. Since the holder is moved vertically while the electrode strip is fed horizontally, the electrode strip is moved up and down once, particularly at the end of the horizontal track, because of the back and forth movement, forming fold lines/points and automatically folding the electrode strip. It is advantageous when the up and down motion of the holder is matched to the feed motion of the electrode strip, so that the electrode strip is always folded between two adjacent electrodes.

The stacking system according to the present invention having the features of the claim provides for a horizontally oriented track for guiding or laying down the electrode strip during a folding process. The already mentioned advantages are hereby derived. Other advantages and preferred features and feature combinations are derived, in particular from the above description and from the claims.

In particular, the folding device features a gripping device having at least two, in particular more than two or a multiplicity of grippers that are associated with the longitudinal sides of the electrode strip or of the track, so that, in each case, two grippers oppose one another, the opposing grippers being designed to grip the electrode strip between each second electrode, to tension it transversely, and raise it. The previously described folding process is thus simply carried out, and the advantages already mentioned are derived.

It is also preferably provided that the gripper device feature a device for holding down the electrode strip between every other second electrode on the horizontal track. Thus, this device holds down the electrode strip between every other second electrode, while the grippers raise the electrode strip between each second electrode. This makes it possible to securely fold, respectively fold up the electrode strip in a Z shape.

The device also preferably includes at least one compressed air nozzle that is connected or connectable to a compressed air generator. This makes simply possible a contact-free holding down, respectively holding down of the electrode strip.

Moreover, the stacking system preferably has a holder for receiving the folded electrode strip, the holder being configured at one end of the track. The electrode strip may be folded into the holder, for example incrementally, as already previously described.

It is especially preferred that the gripper device have two mutually opposing grippers that are guided along a curved, in particular circular track, in order to raise the electrode strip and feed it into the holder. The previously mentioned advantages are derived here. The circular track guidance of the grippers ensures a simple kinematics that avoids a complex robotics, respectively control of a plurality of actuators for moving the grippers. Thus, a cost-effective realization of the gripper device and of the folding device is provided.

It is especially preferred that the stacking system have at least one feeding device associated with the track for feeding the electrode strip to the holder, the holder being vertically movable, in order to fold the electrode strip while the feeding device feeds it into the holder. The already mentioned advantages are also hereby derived.

BRIEF DESCRIPTION OF THE DRAWINGS

The present invention is explained in greater detail in the following with reference to the drawing. To that end.

DETAILED DESCRIPTION OF THE INVENTION

Figure 1:
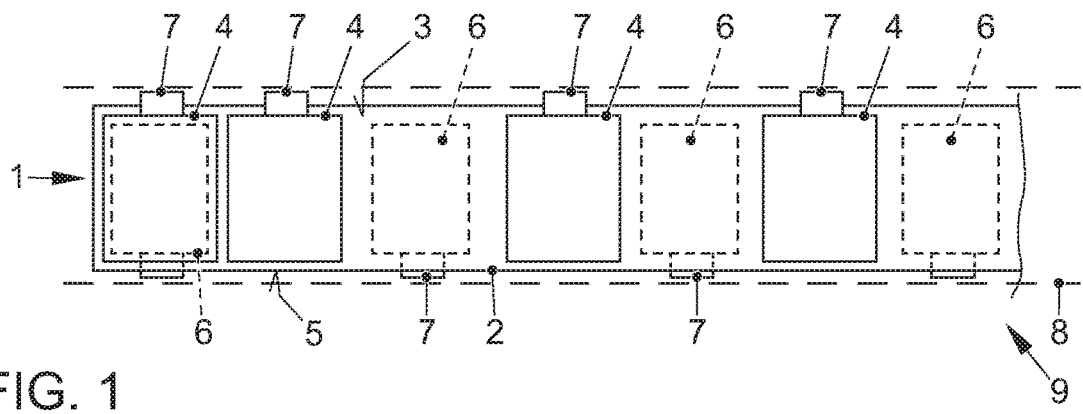
FIG. 1 shows an electrode strip for producing an electrode stack, in a simplified plan view.

In a simplified plan view, FIG. 1 shows an electrode strip 1 which is to be folded into an electrode stack. To that end, electrode strip 1 has a separator 2, which is provided as endless material or as material that is precut to different lengths. A plurality of electrodes, in the present case anodes 4, are placed on a top side 3 of separator strip 2 in such a way that they are uniformly spaced apart. Two anodes 4 are disposed directly adjacently at one end of separator strip 2. In other respects, a plurality of electrodes, in the present case cathodes 6, are placed on bottom side 5 of separator strip 2 in a uniformly spaced apart configuration, so that, except for the end region, a cathode 6 is disposed in each particular case between two anodes 4 on the rear side of separator strip 2. The electrodes have contact elements 7, which project laterally over separator strip 2, to ensure a simple electrical contacting of cathodes 6 and anodes 4. Cathodes 6 and anodes 4 thereby rest on separator strip 2 in such a way that contact elements 7 of the anodes face a first direction, and contact elements 7 of cathodes 6, a second direction opposite thereto. Thus, all cathodes 6 are able to be electrically contacted from one side, and all anodes 4 from the other longitudinal side of the electrode stack or of electrode strip 1.

To produce separator strip 1, separator strip 2 is advantageously first clamped into a first lamination system. Separator 2 features, in particular a plurality of layers, especially a separator layer, a ceramic layer, and an AFL layer (AFL=adhesive functional layer) which, under the action of pressure and heat, form a permanent bond among themselves and with respective electrode 4, 6.

Separator strip 2 is unwound and fed to a lamination unit with the aid of a vacuum table. During feeding of separator 2, a first gripper arm takes anodes 4 one by one from a magazine and sets them down in the previously mentioned, defined spacing on separator strip 2. Together with a protective film, continuous separator 2 and anodes 4 are fed through a heated lamination press, which performs a lamination process at a pressure of 0.8 to 1.2 MPa and a temperature of 75° C. to 95° C. Separator 2 is subsequently optionally wound up together with anodes 4 located there.

Separator strip 2 is subsequently clamped once again or into a second lamination system; as described previously, the first or a second gripper arm positioning the cathodes at this point one by one on rear side 5 under the same boundary conditions. Separator strip 2, together with the cathodes and anodes, is subsequently fed through the lamination press or another lamination press to a second lamination process, in order to also laminate cathodes 6.

Figure 5:
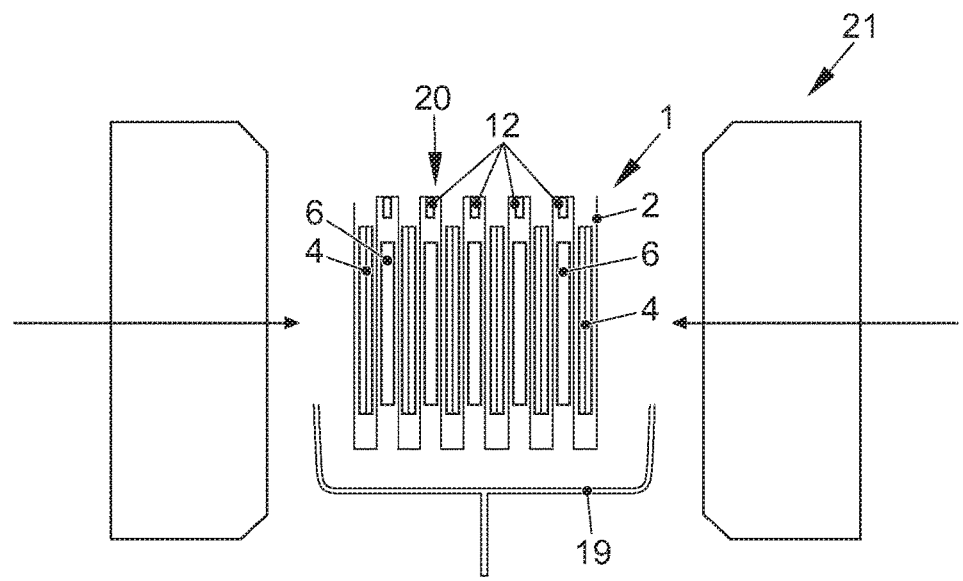
FIG. 5 shows the stacking system in a third state, in a simplified side view.

The thus formed electrode strip 1 is either wound up for a later use or preferably directly laid on a horizontally oriented track 8. Prior to the folding process, electrode strip 1 is optionally cut to the desired length. Track 8 is a component of a stacking system 9, which, moreover, has a folding device 10 for folding electrode strip 1 into an electrode stack 20 (as depicted in FIG. 5).

Figure 2:
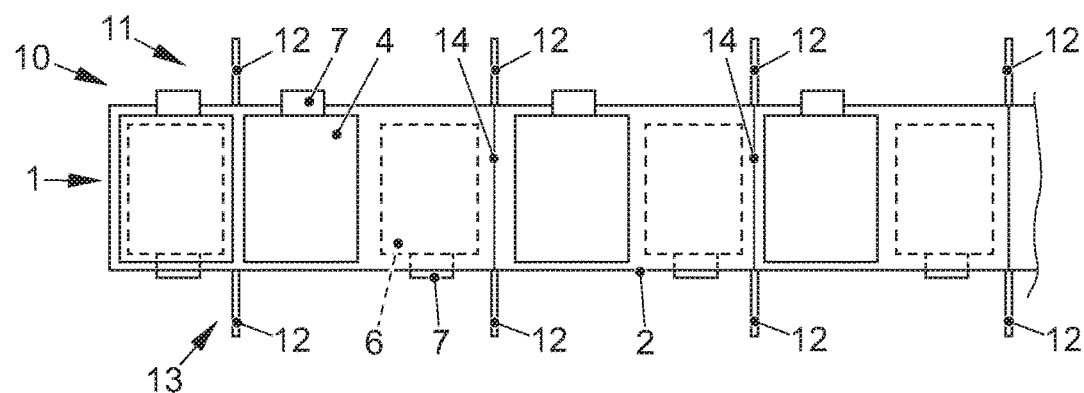
FIG. 2 shows a first exemplary embodiment of a stacking system for folding the electrode strip into the electrode stack, in a simplified plan view.

In a plan view, FIG. 2 shows a first exemplary embodiment of stacking system 9. In this exemplary embodiment, folding device 10 features a gripper device 11, which has a plurality of, in particular independently movable gripper elements 12. Gripper elements 12 are each associated with the longitudinal sides of electrode strip 1; two gripper elements 12 opposing one another in each case and forming a gripper element pair 13. Gripper elements 12 are thereby configured apart from one another along the longitudinal extent of separator strip 2, respectively of track 8 in such a way that they reside between each second electrode 4, 6. Gripper elements 12 are so delicate in construction that they are able to grip separator film 2 between the electrodes. As soon as separator films 2 are gripped, gripper elements 12 of each pair 13 thereof are moved away from each other, so that they exert a tensile stress on separator film 2 transversely to the longitudinal extent thereof. This tensile stress results in highly tensioned linear sections in the separator film that form fold lines 14.

Figure 3:
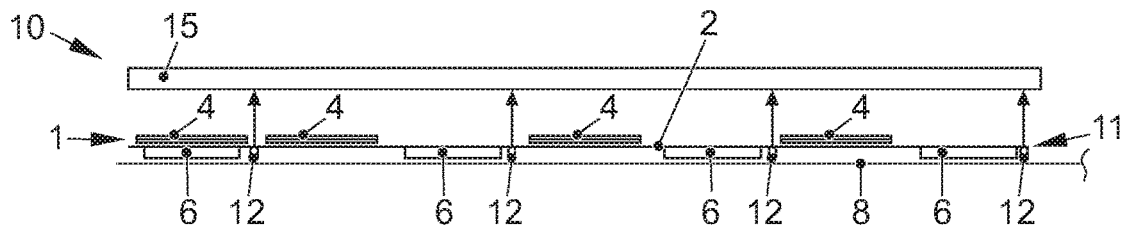
FIG. 3 shows the stacking system in a first state, in a simplified side view.
Figure 4:
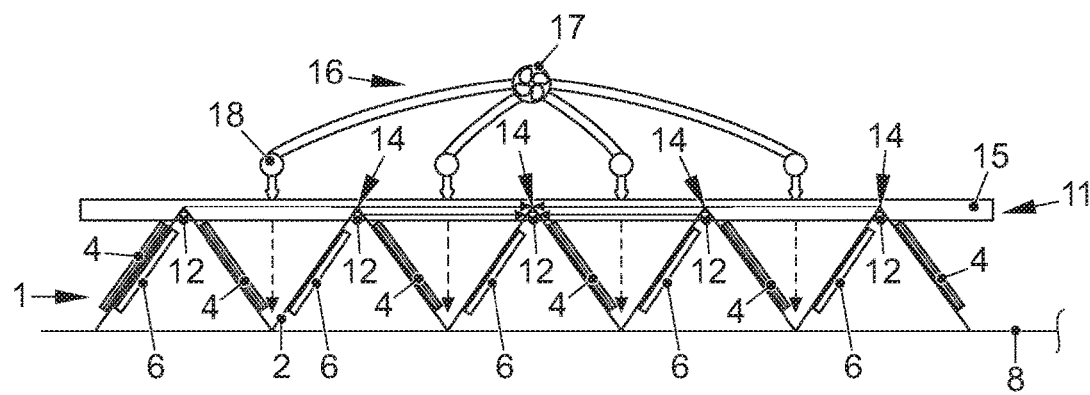
FIG. 4 shows the stacking system in a second state, in a simplified side view.

In this regard, FIG. 3 shows a lateral view of stacking system 9 including electrode strip 1 which rests on track 8. In the present exemplary embodiment, a gripping head 15, which controls gripper elements 12 and moves them in the desired manner using actuators, holds gripper elements 12 above the track, respectively electrode strip 1. Following the lateral gripping of separator strip 2, gripper elements 12 are moved up, away from track 8, as indicated by arrows in FIG. 3. Grippers 12 thereby raise electrode strip 1 between each second electrode, as shown in FIG. 4 in a simplified lateral view, resulting in a Z or zig-zag shaped form of electrode strip 1. At the same time, grippers 12 are moved toward each other, for example, in the center, as arrows show exemplarily in FIG. 1, forming an electrode stack 20 (as depicted in FIG. 5), where anodes and cathodes are alternately disposed on top of one another, respectively one over the other and are separated from one another in each case by separator strip 2. This ensures a simple and inexpensive folding of separator strip 1.

Because of generated fold lines 14, separator strip 2 advantageously creases in response to raising of grippers 12, thereby forming the desired fold. In this approach, the electrodes' own weight may already suffice to ensure the folding. However, a device for holding down electrode strip 1, respectively separator strip 2 between each second other electrode on track 8 is also optionally provided, as shown in FIG. 4. In the present exemplary embodiment, this device 16 has a compressed air generator 17 which is fluidically connected to a plurality of compressed air nozzles 18 to enable a compressed air jet to be applied via the same to separator strip 2. Compressed air nozzles 18 are thereby uniformly disposed, allowing compressed air to be applied to separator strip 2 between each second other electrode, so that in this section, the compressed air holds down the separator strip on track 8.

Thus, a bottom fold edge on separator strip 2, that results in the advantageous fold pattern, is produced by an interplay of compressed air and the force of gravity. The end result is an electrode stack 20 that is stacked in a Z shape. Also, gripper elements 12 are disengaged from separator strip 2 and move laterally out of the folding as soon a retrieval gripper or a holder secures electrode stack 20 in the folded position thereof. For example, the retrieval gripper is moved laterally or from below to electrode stack 20 (as depicted in FIG. 5), in order to remove the same from gripper device 11.

In this regard, FIG. 5 shows a simplified representation of a retrieval gripper 19, which grips electrode stack 20 that is shown in FIG. 5 and results from the previously described folding process and, in particular, which feeds it to a pressing device 21, which presses electrode stack 20 together, as indicated by arrows in FIG. 5. Subsequently, electrode stack 20 is preferably fixed in position by an adhesive tape or the like in the formation thereof, in particular at the open edges, and may be passed on in a process chain for use in an energy store. As mentioned previously, the stack is pressed by pressing device 21 and, in addition, preferably checked for fine inclusions. In this regard, a voltage is preferably applied to the stack, and the ohmic resistance is measured in parallel. If the ohmic resistance is less than a predefinable limiting value, for example, less than 5 mega ohms, then the applied voltage has punched through the separator, respectively separator strip at the locations where a particle resides on the surface. In accordance therewith, stack 20 is discarded. Depending on the separator, the applied voltage varies between 25 V to 1 kV. Electrode stack 20 is only passed on following a successful check test.

The press tools of pressing device 21 are optionally tempered to effect a bonding of the adhesive agents with electrodes 4, 6 and separator protrusions, eliminating the need for a fixing in position using the adhesive tape.

Figure 6:
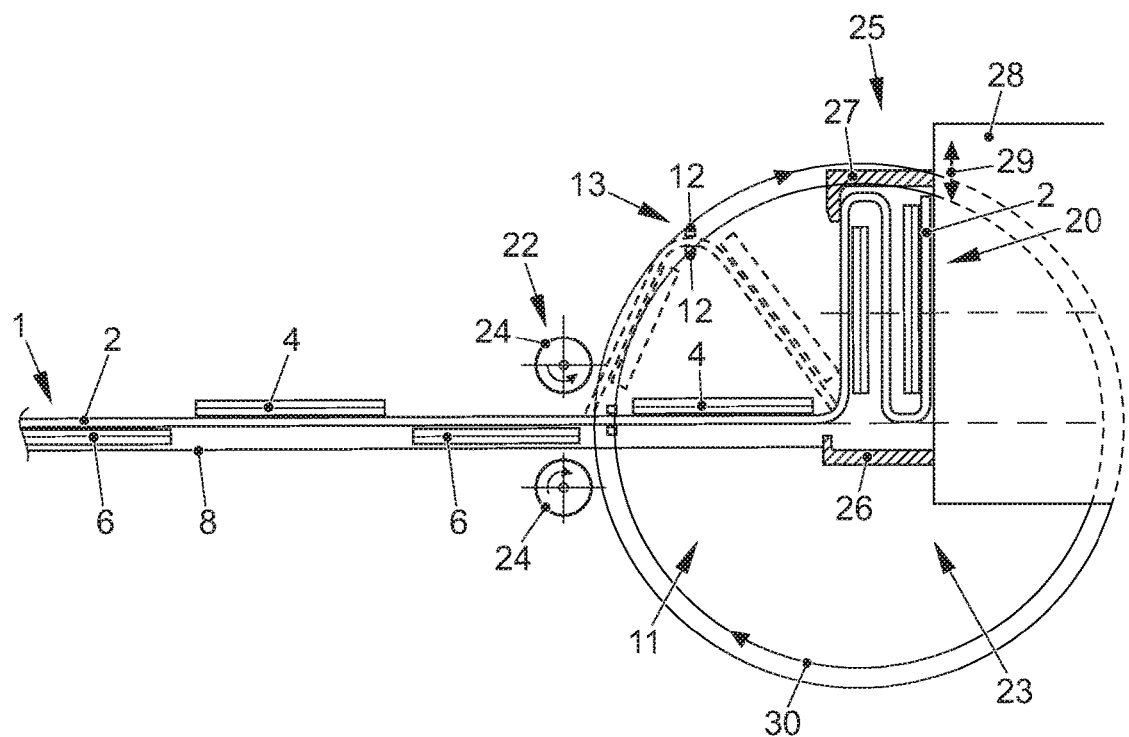
FIG. 6 shows a second exemplary embodiment of the stacking system, in a simplified side view.

In a lateral view, FIG. 6 shows another exemplary embodiment of stacking system 9, elements already known from the preceding exemplary embodiments being provided with the same reference numerals and, in this respect, reference being made to the above description. Essentially only the differences will be discussed below.

In contrast to the preceding exemplary embodiment, electrode strip 1 is not folded simultaneously, but incrementally. In this regard, a feeding device 22 feeds electrode strip 1 on track 8 toward a track end 23. Feeding device 22 features conveyor rollers or rollers 24 which act on electrode strip 1 from two sides and drive the same in opposite directions, in order to feed it horizontally toward track end 23.

A holder 25 is associated with track end 23. Holder 25 has a lower support 26 and an upper hold-down device 27 between which electrode stack 20 is formable. Holder 25 is thereby held on a rigid housing 28 or the like. Hold-down device 27 is thereby vertically adjustable, as illustrated by a double arrow 29.

Moreover, a variant of gripper device 11 is associated with track end 23. In contrast to the preceding exemplary embodiment, gripper device 11 features a gripper pair 13 having two opposite grippers 12, which are moved on the respective longitudinal side of track 8 or of electrode strip 1, in each case along a curved track 30. Curved track 30 is thereby formed as a circular track. The center point thereof is approximately at the height of holder 25. Grippers 12 are thereby moved to raise electrode strip 1 from below from track 8 and, due to the curve guidance, toward holder 25. As a result, the electrode strip is folded into the holder along curved track 18 in response to every rotation of grippers 12. In particular, to prevent a folding back or unfolding, it is provided that hold-down device 27 is raised when gripper pair 13 moves electrode strip 1 into holder 25 and lowered after the electrode strip is folded into holder 25. The interplay of hold-down device 27 and the movement of gripper 12 may also be achieved by a mechanical coupling of these two. Here as well, grippers 12 preferably grip the electrode strip, respectively separator strip 2 in a way that tensions it transversely, forming a fold line that facilitates the folding.

This incremental folding of electrode stack 20 ensures a continuous folding process that makes it possible to produce an electrode stack 20 having many electrodes stacked on each other, even within a small space. While the second exemplary embodiment was described to include only one gripper pair 13, a plurality of gripper pairs 13 are optionally provided which are guided along curved track 30, so that, following the disengagement, when a disengaged gripper pair 13 is moved ahead in the circular track, another gripper pair 13 already grips once again in separator strip 2 and is moved toward holder 20. In particular, gripping device 11 has four gripper pairs 13 of this kind to ensure an advantageous timing.

Hold-down device 27 and lower support 26 are axially, respectively horizontally movable, in order to press the electrode stack portion, which is already situated within holder 20, against housing 28 and thereby carry out a pre-pressing of electrode stack 20 after each folding process has taken place.

Figure 7:
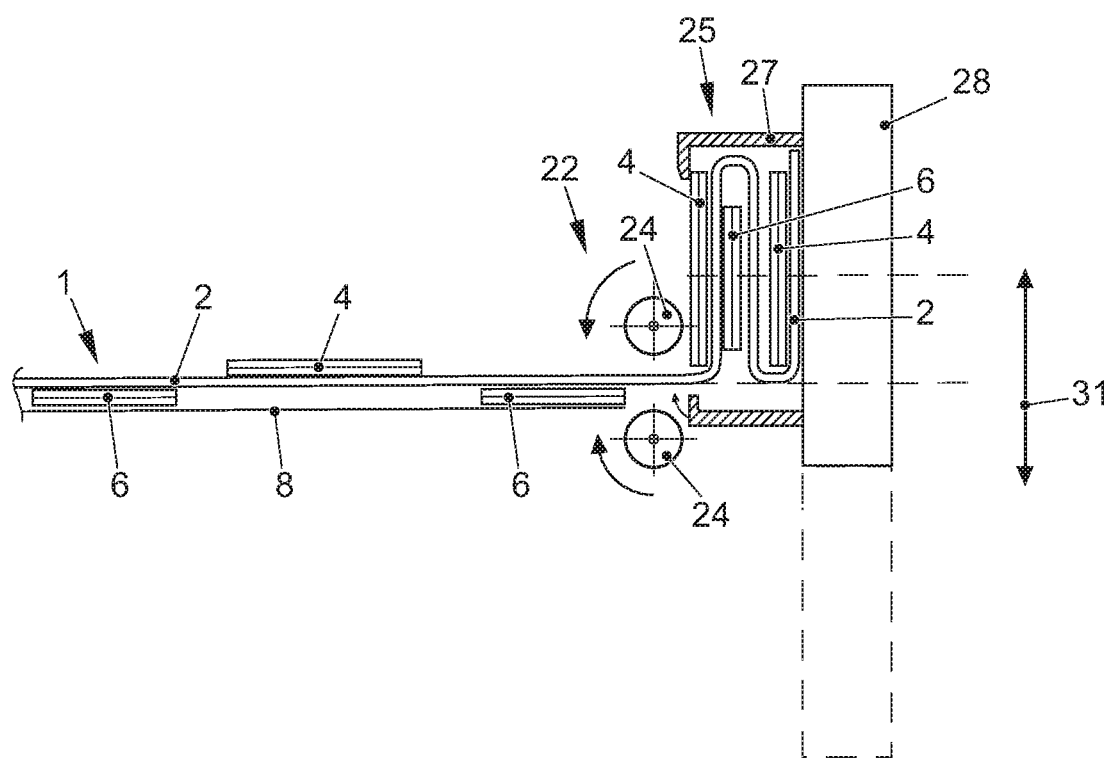
FIG. 7 shows a third exemplary embodiment of the stacking system, in a simplified side view.

FIG. 7 shows a third exemplary embodiment of stacking system 1. It differs from the preceding exemplary embodiment of FIG. 6 in that the folding process is not achieved by a gripping device 11, rather essentially solely by an up and down movement, respectively a vertical movement of previously mentioned holder 25. In this regard, this holder is altogether vertically movably supported on housing 28, as indicated by a double arrow 31.

As previously described, electrode strip 1 is fed by feeding device 22, in particular continuously toward holder 25. The previously mentioned folds of electrode strip 1 are formed by feeding device 22, including conveyor rollers 24, in combination with vertically movable holder 25, which has a sliding type design. This results in a folding of electrode strip 1 located upstream of rollers 24. As previously described, upper hold-down device 27 subsequently takes hold of and fixes in position the ensuing folding. Holder 25 subsequently moves up again and folds electrode strip 1 once more. The electrodes are thereby progressively folded, respectively stacked on each other.

The previously described exemplary embodiments have in common that electrode strip 1 is conveyed horizontally, and stacking system 9 may thereby be advantageously integrated into the process of producing electrode strip 1. However, another exemplary embodiment (not shown here) provides that the electrode strip not be oriented horizontally when fed, rather vertically, or in a vertical plane.

Electrode stack 20 produced in the manner previously described, respectively an energy store fabricated with the aid of electrode stack 20 is preferably used in motor vehicles, in particular in the capacity of a traction battery. However, electrode stack 20, respectively the energy store may also be used in other mobile applications, such as cellular phones or laptops, for example.

LIST OF REFERENCE NUMERALS 1 electrode strip
2 separator strip
3 upper side
4 anode
5 bottom side
6 cathode
7 contact element
8 track
9 stacking system
10 folding device
11 gripping device
12 gripper
13 gripper pair
14 fold line
15 gripping head
16 device
17 compressed air generator
18 compressed air nozzle
19 retrieval gripper
20 electrode stack
21 pressing device
22 feeding device
23 track end
24 roller
25 holder
26 support
27 hold-down device 28 housing
29 double arrow
30 curved track
31 double arrow

The invention claimed is:

1. A stacking system for producing an electrode stack, comprising
   a folding device for folding an electrode strip, having a separator strip having anodes and cathodes laid thereon, into an electrode stack, in which where anodes and cathodes are alternately stacked on top of one another with the interposition of the separator strip,
   at least one horizontally oriented track for guiding the electrode strip or for laying it during a folding process, and
   a gripping device having at least two grippers that are associated or able to be associated with longitudinal sides of the electrode strip, so that, in each case, two grippers oppose one another, the grippers being designed to grip the electrode strip between each second electrode to tension it transversely and raise it.

2. The stacking system as recited in claim 1, wherein the gripping device has a device for holding down the electrode strip between every second other electrode on the horizontal track.

3. The stacking system as recited in claim 1, wherein the device includes at least one compressed air nozzle that is connected or connectable to a compressed air generator.

4. The stacking system as recited in claim 1, wherein a holder for accommodating the folded electrode strip is associated with a track end of the horizontal track.

5. The stacking system as recited in claim 4, wherein two opposing grippers of the gripping device are guided along a curved track in order to raise the electrode strip and feed it into the holder.

6. The stacking system as recited in claim 5, wherein the curved track is a circular track.

7. The stacking system as recited in claim 4, wherein the horizontal track has at least one feeding device for feeding the electrode strip to the holder, the holder being vertically movable, in order to fold the electrode strip while the feeding device feeds it into the holder.

8. A stacking system for producing an electrode stack, comprising:
   a folding device for folding an electrode strip, having a separator strip having anodes and cathodes laid thereon, into an electrode stack, in which where anodes and cathodes are alternately stacked on top of one another with the interposition of the separator strip,
   at least one horizontally oriented track for guiding the electrode strip or for laying it during a folding process, and
   a gripping device having at least two opposing grippers that are associated or able to be associated with longitudinal sides of the electrode strip, wherein the two opposing grippers of the gripping device are guided along a curved track in order to raise the electrode strip and feed it into the holder.

9. The stacking system as recited in claim 8, wherein the gripping device has a device for holding down the electrode strip between every second other electrode on the horizontal track.

10. The stacking system as recited in claim 9, wherein the device includes at least one compressed air nozzle that is connected or connectable to a compressed air generator.

11. The stacking system as recited in claim 8, wherein a holder for accommodating the folded electrode strip is associated with a track end of the horizontal track.

12. The stacking system as recited in claim 11, wherein the horizontal track has at least one feeding device for feeding the electrode strip to the holder, the holder being vertically movable, in order to fold the electrode strip while the feeding device feeds it into the holder.

13. The stacking system as recited in claim 8, wherein the curved track is a circular track.

* * * * *